(12) United States Patent
Lambert et al.

(10) Patent No.: US 11,677,282 B2
(45) Date of Patent: Jun. 13, 2023

(54) COMPOSITE MATERIAL FOR THERMAL MANAGEMENT IN AN ELECTRIC MOTOR

(71) Applicant: Accelerated Systems Inc., Waterloo (CA)

(72) Inventors: Timothy Nicholas Leslie Lambert, Los Angeles, CA (US); Elizabeth Cheryl Margaret Trickett, Oakville (CA); John Glen Gillies, Toronto (CA)

(73) Assignee: ACCELERATED SYSTEMS INC., Waterloo (CA)

( * ) Notice: Subject to any disclaimer, the term of this patent is extended or adjusted under 35 U.S.C. 154(b) by 301 days.

(21) Appl. No.: 17/180,808

(22) Filed: Feb. 21, 2021

(65) Prior Publication Data

US 2021/0273499 A1    Sep. 2, 2021

Related U.S. Application Data (60) Provisional application No. 62/982,106, filed on Feb. 27, 2020.

(51) Int. Cl.
| | | |
|---|---|---|
| *H02K 1/16* | (2006.01) | |
| *B32B 5/16* | (2006.01) | |
| *B32B 27/08* | (2006.01) | |
| *B32B 27/36* | (2006.01) | |
| *H02K 1/02* | (2006.01) | |
| *B32B 27/18* | (2006.01) | |

(52) U.S. Cl.
CPC ............ *H02K 1/165* (2013.01); *B32B 5/16* (2013.01); *B32B 27/08* (2013.01); *B32B 27/18* (2013.01); *B32B 27/36* (2013.01); *H02K 1/02* (2013.01)

(58) Field of Classification Search
CPC ........... B32B 5/16; B32B 27/08; B32B 27/18; B32B 27/36; H02K 1/02; H02K 1/16; H02K 1/165
USPC .................... 310/216.001, 216.105, 216.115
See application file for complete search history.

(56) References Cited

U.S. PATENT DOCUMENTS

| | | | | |
|---|---|---|---|---|
| 7,776,392 B2* | 8/2010 | Smith | ..................... | B32B 29/02 427/407.1 |
| 7,781,057 B2* | 8/2010 | Smith | ................... | C08L 101/00 428/343 |
| 10,177,631 B1* | 1/2019 | Hopkins | ................ | H02K 7/083 |
| 11,575,129 B2* | 2/2023 | Yushin | ................... | H01M 4/625 |
| 2005/0274450 A1* | 12/2005 | Smith | ..................... | H01B 3/12 156/187 |
| 2005/0277351 A1* | 12/2005 | Smith | ..................... | C08K 3/28 428/297.4 |

(Continued)

OTHER PUBLICATIONS

Huang, X., Qi, X., Boey, F. Y. C., and Zhang, H.—Graphene-Based Composites—Chemical Society Reviews—2012—41, 666-686.

(Continued)

*Primary Examiner* — Rashad H Johnson
(74) *Attorney, Agent, or Firm* — Nyssa Inc.

(57) ABSTRACT

An electric motor including a stator having a stator slot, and a composite material within the stator slot. The composite material includes a matrix material, and additive particles having thermal conductivity and anisotropic electric properties. The additive particles are oriented in an aligned configuration and set to provide the composite material with thermal conductivity and reduced electrical conductivity in at least one direction based on the aligned configuration.

20 Claims, 9 Drawing Sheets

(56) References Cited

U.S. PATENT DOCUMENTS

| | | | |
|---|---|---|---|
| 2010/0239851 A1* | 9/2010 | Stevens | H05K 1/0373 428/327 |
| 2010/0311936 A1* | 12/2010 | Smith | C09K 19/388 528/395 |
| 2016/0107739 A1* | 4/2016 | Restuccia | C08J 5/248 252/514 |
| 2019/0372441 A1* | 12/2019 | Yin | C25D 13/02 |

OTHER PUBLICATIONS

E.K. Gamstedt; M. Skrifvars; T.K. Jacobsen; and R. Pyrz—Synthesis of unsaturated polyesters for improved interfacial strength in carbon fibre composites—Composites Part A: Applied Science and Manufacturing—vol. 33, Issue 9, 2002.

E. Fairall; C. Rheberhegen; E. Rowan; J. Lo; B. Bilgin; and A. Emadi—Maximizing thermal effectiveness and minimizing parasitic loss in a liquid cooled switched reluctance machine—IEEE Transportation Electrification Conference and Expo (ITEC), Dearborn, MI, USA—2016—pp. 1-7.

C. Rhebergen; B. Bilgin; A. Emadi; E. Rowan; and J. Lo—Enhancement of electric motor thermal management through axial cooling methods: A materials approach—IEEE Energy Conversion Congress and Exposition (ECCE), Montreal, QC—2015—pp. 5682-5688.

C. Rhebergen, Master's Thesis—https://macsphere.mcmaster.ca/handle/11375/18137—Nov. 2015.

* cited by examiner

100

Providing a mixture of a flowable and settable matrix material and solid additive particles, the additive particles being alignable using an external force field

105

Depositing the mixture into a reservoir having a reservoir shape

110

Applying the force field to the mixture to align the additive particles in the matrix material into an aligned configuration

115

Causing the mixture to set while the additive particles are in the aligned configuration to form a composite material having substantially the reservoir shape and the additive particles fixed in the aligned configuration

COMPOSITE MATERIAL FOR THERMAL MANAGEMENT IN AN ELECTRIC MOTOR

RELATED APPLICATIONS

This application claims priority to U.S. Provisional App. No. 62/982,106, filed Feb. 27, 2020 and entitled COMPOSITE MATERIALS FOR THERMAL MANAGEMENT IN ELECTRICAL DEVICES, the entire contents of which are hereby incorporated by reference herein for all purposes.

TECHNICAL FIELD

The embodiments herein relate to composite materials for thermal management. More particularly, the embodiments herein relate electric motors having a stator slot filled with a composite material to provide thermal management and reduced electrical conductivity.

INTRODUCTION

The following paragraphs are not an admission that anything discussed in them is prior art or part of the knowledge of persons skilled in the art.

Electrical devices use an electrical current to perform work. Examples of such electrical devices may include electric motors, electrical transformers, printed circuit boards (PCBs), electronics, and the like. The flow or transformation of this electrical current may cause various components in such electrical devices to heat up. Managing this heat buildup may prevent, or reduce the likelihood of, thermal failures of such electrical devices. In some examples, managing the heat buildup may include conducting or transporting the heat or thermal energy from the component where it is generated to another component or location where the thermal energy may be safely dissipated.

Thermally conductive materials may be used as thermal conductors to transport the thermal energy from the components where it is generated to a point of safe dissipation. Many thermally conductive materials are also electrically conductive. In electrical devices, this electrical conductivity may pose a risk of causing electrical shorts between the various electrical components of the electrical devices. Moreover, this electrical conductivity may also cause parasitic electrical or magnetic behaviors that may interfere with the functioning of the electrical devices.

SUMMARY

One general aspect includes an electric motor including: a stator having a stator slot; and a composite material within the stator slot. The composite material includes a matrix material, and additive particles having thermal conductivity and anisotropic electric properties. The additive particles are oriented in an aligned configuration and set to provide the composite material with thermal conductivity and reduced electrical conductivity in at least one direction based on the aligned configuration.

The additive particles may be oriented into the aligned configuration using an electromagnetic field.

The matrix material may include a thermoset material selected to cooperate with the additive particles to enhance thermal conductivity of the composite material within the stator slot after setting of the matrix material. The thermoset material may be unsaturated polyester, and the additive particles may be graphene flakes.

The additive particles may be planar flakes that extend longitudinally along operating electromagnetic field lines of the electric motor in the aligned configuration. The planar flakes may be substantially parallel with the operating electromagnetic field lines of the electric motor in the aligned configuration. The additive particles in the aligned configuration may be edge-on relative to the operating electromagnetic field lines of the electric motor.

The stator may include a laminated plate stack, and the additive particles are oriented in planes aligned with the laminated plate stack. The additive particles may be substantially parallel with the laminated plate stack.

One general aspect includes a method of making a composite material. The method includes depositing a matrix material into a stator slot of an electric motor. The matrix material is settable, and includes additive particles having thermal conductivity, and anisotropic electric properties. The method also includes applying an electromagnetic field to the matrix material to orient the additive particles in an aligned configuration; and setting the matrix material while the additive particles are in the aligned configuration to form a composite material having thermal conductivity and reduced electrical conductivity in at least one direction based on the aligned configuration.

The matrix material may include a thermoset material selected to cooperate with the additive particles to enhance thermal conductivity of the composite material within the stator slot after setting of the matrix material. The thermoset material may be unsaturated polyester, and the additive particles may be graphene flakes.

The additive particles may be planar flakes that extend longitudinally along operating electromagnetic field lines of the electric motor in the aligned configuration. The planar flakes may be substantially parallel with the operating electromagnetic field lines of the electric motor in the aligned configuration. The additive particles in the aligned configuration may be edge-on relative to operating electromagnetic fields of the electric motor. The electric motor may include a stator having a laminated plate stack, and the additive particles may be oriented in planes aligned with the laminated plate stack. The additive particles may be substantially parallel with the laminated plate stack.

The electromagnetic field may be applied using DC current. The electromagnetic field may be applied using AC current.

The electromagnetic field may include: a first electromagnetic field for aligning some of the additive particles in a first aligned configuration; and a second electromagnetic field for aligning some of the additive particles in a second aligned configuration.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. Some example implementations of the present specification will now be described with reference to the attached Figures, wherein.

DETAILED DESCRIPTION

Various apparatuses or processes will be described below to provide exemplary embodiments. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed below that is not claimed in this document may be the subject matter of another protective instrument, for example, a continuing patent application, and the applicants, inventors or owners do not intend to abandon, disclaim or dedicate to the public any such invention by its disclosure in this document.

Unless the context requires otherwise, throughout this specification the word "comprise" and variations thereof, such as, "comprises" and "comprising" are to be construed in an open, inclusive sense, that is as "including, but not limited to."

As used in this specification, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
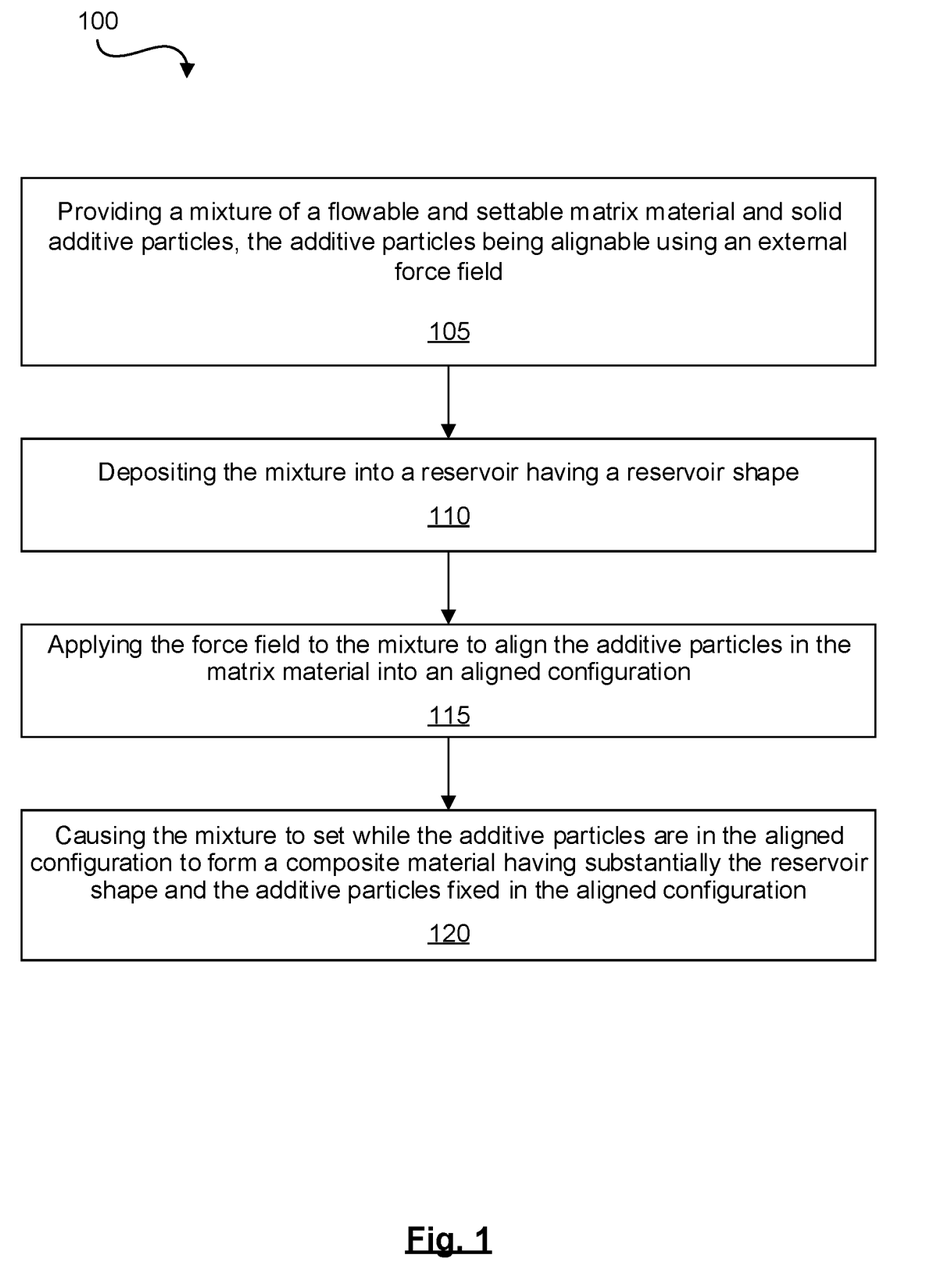
FIG. 1 shows a flowchart of an example method which may be used to form an example composite material, in accordance with a non-limiting implementation of the present specification.

A composite material may be used to provide thermal conductivity, with reduced electrical conductivity (such as low or no electrical conductivity). Such a composite material may be used for thermal management in an electrical device, while posing relatively low or no risk of causing electrical shorts or electrical or magnetic parasitic behaviors. FIG. 1 shows a flowchart of an example method 100 which may be used to form an example composite material. Such a composite material may, in turn, be used for thermal management in electrical devices.

At box 105 of method 100, a mixture may be provided of a flowable and settable matrix material and solid additive particles. The additive particles may be alignable using an external force field such as an electromagnetic field. The flowability of the matrix material may allow it to take the shape of the reservoir into which it is deposited. The settability of the matrix material, in turn, may allow the matrix material to then set and retain the shape of the reservoir upon the removal of the reservoir. In some examples, the matrix material may comprise a thermoset material. Moreover, in some examples, the matrix material may comprise a polymerizable or a cross-linkable composition. Furthermore, in some examples, the matrix material may comprise a polymer, an oligomer, or polymer precursors. In addition, in some examples, the matrix material may comprise a combination of one or more of a polymer, an oligomer, and polymer precursors. Moreover, in some examples, the matrix material may comprise polyester. In addition, in some examples, the polyester may comprise an unsaturated polyester. Furthermore, in some examples, the matrix material may comprise polyamide, polyesther, polypropylene, polystyrene, polyvinyl chloride, polymethylmetachrylate, polycarbonate, polytetrafluoroethylene, epoxy resin, phenolic resin, silicon resin, polyester resin, and the like.

Turning now to the solid additive particles, in some examples the additive particles may comprise particles of a thermally conductive material. Moreover, in some examples, the additive particles may comprise particles of an electrically conductive or electrically polarizable material. Furthermore, in some examples, the additive particles may comprise particles of a magnetic or magnetizable material. The electrical or magnetic properties of such additive particles may allow the additive particles to be aligned using an electrical or magnetic force field. The electrical or magnetic force field may also be described as an electrical, magnetic, or electromagnetic field. In some examples, the force field may comprise a field which, upon interaction with the additive particles, causes a force to be applied to or experienced by the additive particles. This force, in turn, may be used to align the additive particles. As such, in these examples the force field may also be described simply as a field.

In some examples, the source of this electrical or magnetic force field may be external to or distinct from the mixture of the matrix material and the additive particles, which electrical or magnetic force field may extend into or through the matrix material. Such an electrical or magnetic force field may be described as an external electrical or magnetic force field. It is also contemplated that in some examples, the source of the force field may be at least partially inside the mixture.

Depending on the application for which the composite material is to be used, the additive particles may have different sizes, shapes, or compositions. In some examples, the additive particles may be in the nanometer size range. Moreover, in some examples, the additive particles may be in the micrometer size range. Furthermore, in some examples, the additive particles may be in the millimeter size range. In addition, in some examples, the additive particles may be in the centimeter or larger size range. It is also contemplated that in some examples, the additive particles may have a relatively wide size distribution spanning two or more of the above size ranges. Furthermore, it is contemplated that in some examples, the additive particles may have a relatively narrow size distribution fitting within one of the size ranges described above, or within a smaller sub-range of one of the size ranges described above.

In some examples, the additive particles may be shaped as sheet-shaped pieces or as flakes. Such sheet-shaped pieces or flakes may also be described as two-dimensional (2D) materials. For example, such sheet-shaped pieces may comprise graphene flakes or sheet-shaped pieces, boron nitride flakes or sheet-shaped pieces, and the like. In some examples, the boron nitride may comprise hexagonal boron nitride (hBN), and the like. Moreover, in some examples, the additive particles may be shaped as one-dimensional (1D) materials such as nanotubes, nanorods, nanowires, fiber fragments, and the like.

In addition, in some examples, such one-dimensional or two-dimensional materials may have anisotropic properties such as anisotropic thermal or anisotropic electrical properties. For example, graphene has a relatively high thermal and electrical conductivity in the plane of the sheets of the graphene pieces, while having relatively lower thermal and electrical conductivity out of the plane of the sheets of the graphene pieces. Such anisotropic properties may be used to tune the thermal and electrical conductivity of composite materials made using such additive particles by tuning the alignment of those additive particles. Examples of aligning additive particles, and tuning the thermal and electrical properties of the composite materials including such additive particles, are discussed in greater detail in relation to FIGS. 2-9.

In some examples, providing the mixture of the matrix material and the additive particles may include mixing the additive materials into the matrix material. Moreover, in some examples, the mixing of the additive particles in the matrix material may include mixing the additive particles in the matrix material using mixing or dispersal techniques such as mechanical agitation, sonication or ultrasonication, and the like. In some examples, mechanical agitation may include kneading, shear mixing, and the like. Furthermore, in some examples, the mixing of the matrix material and the additive particles may further include degassing the mixture to reduce the likelihood of the presence of gas bubbles or cavities in the mixture. In some examples, such degassing may be performed by placing the mixture under reduced pressure, and the like.

In addition, in some examples, a catalyst or an initiator may be added to the matrix during the mixing process. This catalyst or initiator may start the process of setting or hardening the matrix material from a flowable state in which the matrix material may take the shape of the reservoir into which it is deposited, to a set or hardened state in which the matrix material is no longer flowable and will retain the shape of the reservoir upon removal of the reservoir. The setting of the matrix material of the mixture is discussed in greater detail in relation to box 120.

Furthermore, in some examples, the mixing of the additive particles into the matrix material may increase the degree of uniformity of dispersion of the additive particles in the matrix material. In some examples, a more uniform dispersion of the additive particles in the matrix material may allow for the composite material made from setting or hardening the mixture to have more uniform thermal or electrical properties throughout its volume.

Turning now to box 110 of method 100, the mixture of the additive particles and the matrix material may be deposited into a reservoir having a reservoir shape. This deposition may be facilitated by the flowability of the matrix material.

As such, in some examples, the mixture may be deposited into the reservoir using techniques such as flowing the mixture into the reservoir, injecting the mixture into the reservoir, pumping the mixture into reservoir, doctor blading the mixture into the reservoir, suction-depositing the mixture into the reservoir, mechanically agitating the mixture into the reservoir, spinning or centrifugally depositing the mixture into the reservoir, and the like.

In some examples, the reservoir may comprise a space or gap in or on an electrical device. For example, the reservoir may be formed in the space between the stator teeth of a stator of an electric motor (the space may be referred to as a stator slot), as is described in greater detail in relation to FIGS. 4-9. Moreover, in some examples, the reservoir may comprise the space on top of a printed circuit board, or in between or on top of electronic components placed on a printed circuit board. It is also contemplated that in some examples, the reservoir may be a different space in or on a different electrical device.

Moreover, in some examples, the reservoir may comprise a mold. In some examples, the mold may comprise a silicone mold, an injection molding mold, and the like. In examples where the reservoir comprises a mold, upon completion of the steps of method 100 the mold may be removed to provide a freestanding composite material made from the mixture of the matrix material and the additive particles. This composite material may have a shape that is the same, or about the same, as the shape of the mold or reservoir. Such a freestanding composite material may then be placed in or on an electrical device to assist with thermal management of one or more components of that device.

Turning now to box 115 of method 100, the force field may be applied to the mixture to align the additive particles in the matrix material into an aligned configuration. In some examples, the force field may comprise an electromagnetic field generated using positive and negative electrodes. This electromagnetic field may pass into or through the mixture. As the additive particles each align themselves with this electromagnetic field, the application of the electromagnetic field may be used to align the additive particles into an aligned configuration.

Tailoring electrical or other parameters associated with the electrodes may be used to tailor the electromagnetic field. Examples of such parameters may include the number, shapes, sizes, positioning, or charges of the electrodes, and the like. Tailoring the electromagnetic field, in turn, may allow for tailoring the properties of the aligned configuration of the additive particles. Examples of such properties include the shape of the aligned configuration, the degree of alignment of the additive particles in the aligned configuration, and the like. Examples of aligning the additive particles using an electromagnetic field are described in greater detail in relation to FIGS. 2-9.

Turning now to box 120, the mixture may be caused to set while the additive particles are in the aligned configuration. Causing the mixture to set may form a composite material that has substantially the reservoir shape and the additive particles fixed in the aligned configuration. In other words, while the mixture would have been flowable when deposited into the reservoir, upon setting the mixture may no longer be flowable and may retain the shape of the reservoir, even upon removal of the reservoir. It is contemplated that in some examples the reservoir need not be removed, and the composite material may remain in the reservoir to provide thermal management for the reservoir or to the components of an electrical device proximate the reservoir.

In some examples, the mixture may be caused to set using triggers such as changing the temperature of the mixture, adding a catalyst or an initiator material to the mixture, exposing the mixture to light, exposing the mixture to charged particles such as an electron-beam or ionizing radiation, and the like. These triggers may cause physical or chemical changes affecting the matrix material, or the combination of the additive particles and the matrix material, to cause the mixture to set.

For example, reducing the temperature of the mixture may cause the mixture to change physical states from a flowable state to a hardened or set state. Moreover, in some examples, increasing the temperature of the mixture may trigger a chemical change in the mixture to cause the mixture to change states from a flowable state to a set or hardened state. In some examples such a chemical change may comprise polymerization, cross-linking, and the like. Furthermore, in some examples, such a chemical change may be triggered using an initiator or a catalyst.

It is contemplated that in some examples, the catalyst or the initiator may be added to the mixture, or may be present in the mixture, at box 105 of method 100 when the mixture is provided. In such examples, the cause for the mixture setting may be described as the addition of the catalyst or the initiator to the mixture. Furthermore, in some examples where an initiator or catalyst is present in the mixture prior to the alignment of the additive particles, the passage of time may also be described as a cause or trigger for the setting of the mixture. In such examples, the chemical changes initiated by the catalyst or the initiator may take a period of time to cause the mixture to change from a flowable state to a set state. Moreover, in such examples, the depositing of the mixture into the reservoir and the applying of the force field to align the additive particles may be completed within the period of time before the mixture changes to its set state.

In addition, in some examples, chemical changes in the mixture may include chemical reactions between the matrix material and the additive particles. For example, when the matrix material is caused to undergo chemical changes to cause the matrix material to set, the matrix material may also form chemical bonds with the additive particles. In some examples, these chemical bonds may enhance thermal conduction between the matrix material and the additive particles. This enhanced thermal conduction, in turn, may enhance the thermal conductivity of the composite material along the directions along which the additive particles have been aligned in their aligned configuration.

Furthermore, in some examples, after causing the mixture to set to form the composite material, the reservoir may be removed to provide a freestanding composite material. This composite material may then be used inside or on an electrical device to provide thermal management to the device.

Figure 2:
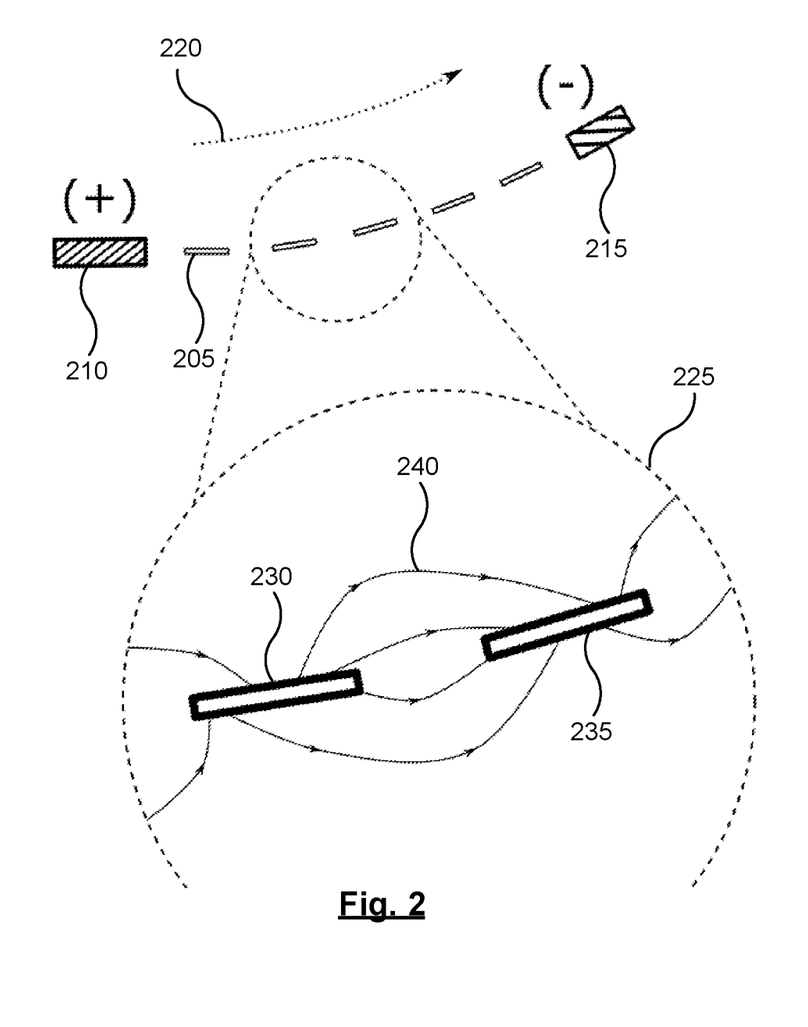
FIG. 2 shows a schematic representation of a set of additive particles aligned between two electrodes, in accordance with a non-limiting implementation of the present specification.

Turning now to FIG. 2, a schematic representation is shown of a set of additive particles aligned between two electrodes 210 and 215. While not shown in FIG. 2, it is contemplated that in some examples the additive particles may be within the matrix material, as discussed above. The set of additive particles may include additive particles 205 and 230. While FIG. 2 shows a set of five identical additive particles, it is contemplated that in some examples, a different number of additive particles may be used, and that the additive particles may be different from one another.

Once electrified, electrodes 210 and 215 may create an electric field extending between electrode 210 and electrode 215. In some examples, electrodes 210 and 215 may be electrified using a DC power source. Arrow 220 is an example force field line that may be a part of such an electric field extending between electrodes 210 and 215. As shown in FIG. 2, additive particles may align themselves end-to-end between electrodes 210 and 215 along the force field line shown by arrow 220. This may be referred to as a longitudinal alignment.

FIG. 2 also shows a magnified portion 225 depicting two adjacent additive particles 230 and 235. Lines such as line 240 represent schematically the interactions between adjacent additive particles such as additive particles 230 and 235. In some examples, lines such as line 240 may represent the electric field lines between adjacent additive particles. Moreover, in some examples, lines such as line 240 may represent thermal conduction interactions between adjacent additive particles such as additive particles 230 and 235.

Figure 3:
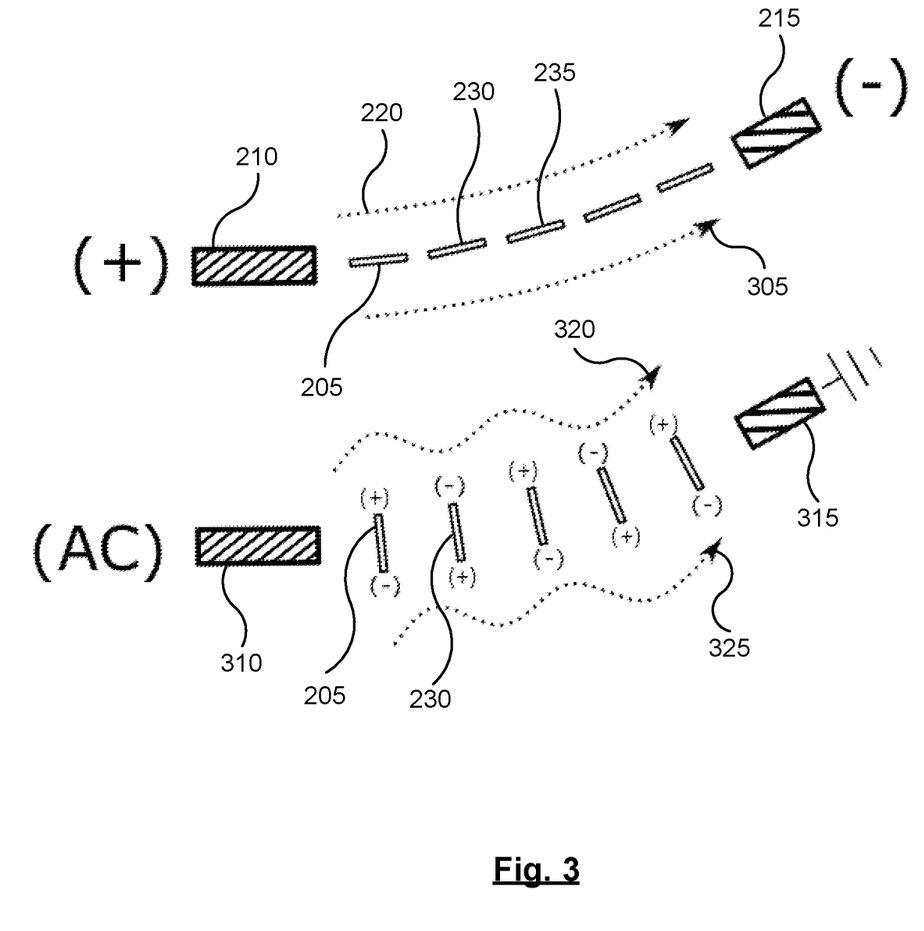
FIG. 3 shows schematic representations of example alignments of example additive particles between corresponding electrodes, in accordance with a non-limiting implementation of the present specification.

Turning now to FIG. 3, schematic representations are shown of example alignments of example additive particles between corresponding electrodes. The top schematic representation shows a set of additive particles aligned between electrodes 210 and 215 by applying a DC power between electrodes 210 and 215 to create an electric field between these two electrodes as exemplified by arrows 220 and 305. As shown in FIGS. 2 and 3, the application of the DC power may be used to align the additive particles in an end-to-end configuration.

The bottom schematic representation in FIG. 3, in turn, shows the same set of additive particles aligned using electrodes 310 and 315. Electrodes 310 and 315 may be similar to electrodes 210 and 215. A difference between the top and the bottom schematics may be that in the bottom schematic an AC power is applied between electrodes 310 and 315. Such an AC power creates an alternating electric field between electrodes 310 and 315. Example field lines of such an alternating electric field are represented by arrows 320 and 325. Such an alternating electric field, in turn, may be used to align the additive particles in a side-by-side orientation. This may be referred to as an orthogonal alignment. As such, FIG. 3 shows that tailoring the properties of the electric field applied to the additive particles may be used to tailor or adjust the alignment of the additive particles obtained using such electric fields.

Figure 4:
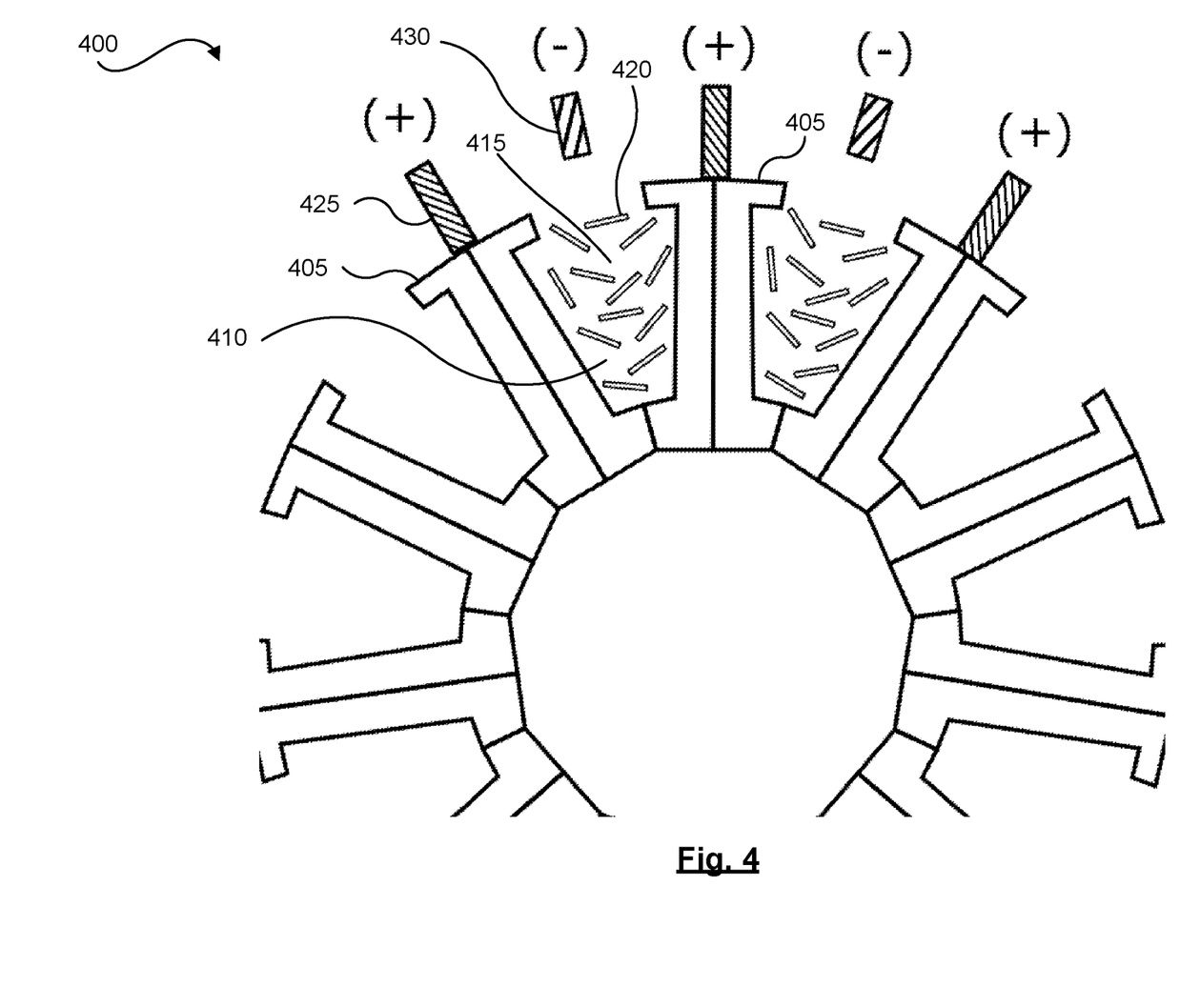
FIG. 4 shows a partial side elevation schematic view of an example stator for an example electric motor, in accordance with a non-limiting implementation of the present specification.

Turning now to FIG. 4, a partial side elevation schematic view is shown of an example stator 400, which stator may be used in an electric motor. Stator 400 may comprise stator teeth 405, which may be formed from a laminated plate stack 407. In some examples, stator 400 may comprise windings wound around each of teeth 405. These windings are omitted from FIG. 4 for clarity of illustration. Stator 400 may comprise spaces 410 (also referred to as stator slots) between adjacent teeth 405. These spaces 410, individually or collectively, may be used as a reservoir or mold for receiving a mixture of a matrix material and additive particles which mixture may then be used to form a composite material. Such a composite material may be used as a thermal management material to facilitate conduction of heat away from the windings and their corresponding stator teeth. In some examples, the composite materials described herein may be used in stator 400 as such thermal management materials.

Figure 5:
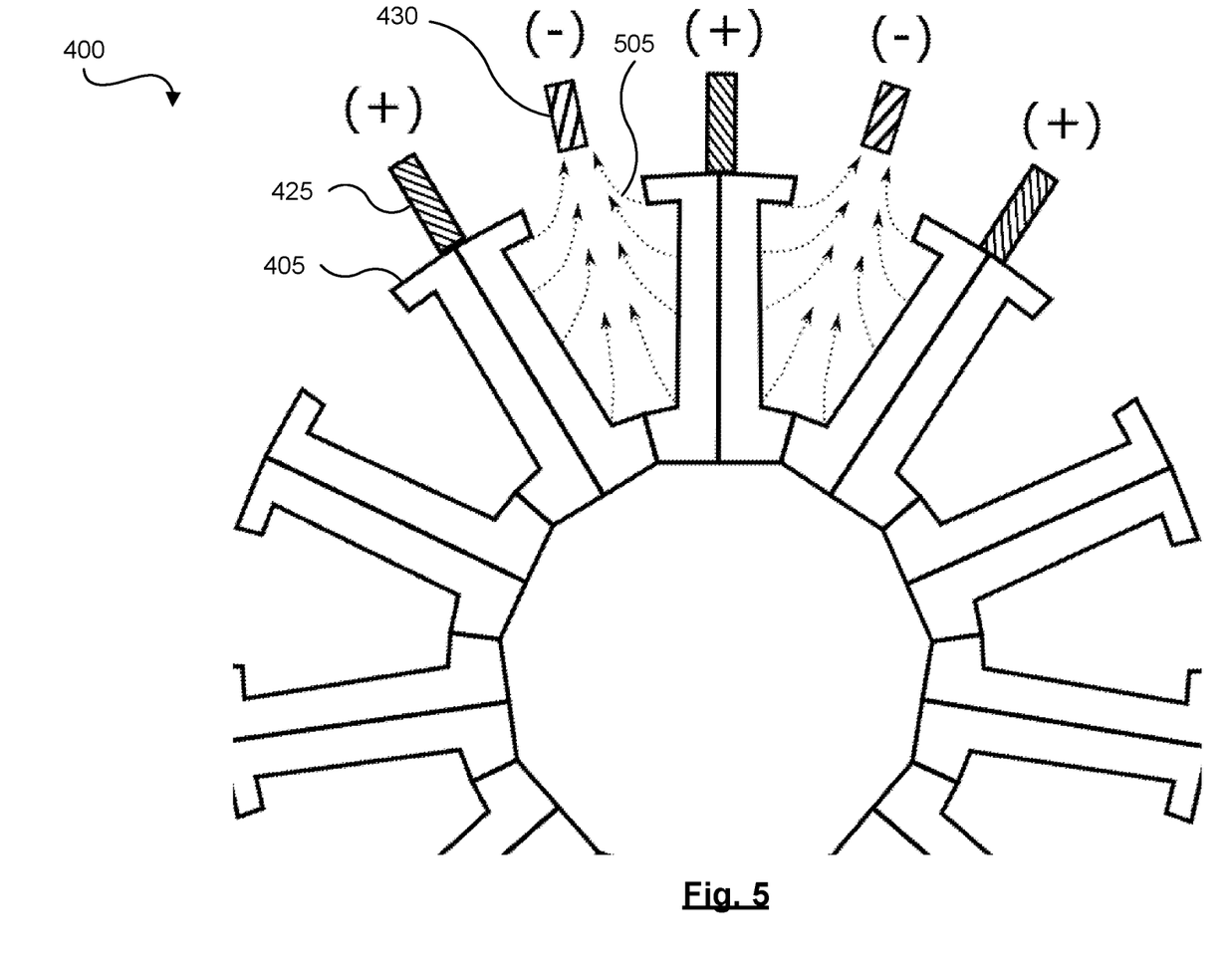
FIG. 5 shows another partial side elevation schematic view of the stator of FIG. 4, in accordance with a non-limiting implementation of the present specification.

FIG. 4 shows additive particles 420 of such a composite material. Additive particles 420 may be similar to the additive particles described in relation to FIGS. 2 and 3. Additive particles 420 may be inside a matrix material 415. When the mixture of additive particles 420 and the matrix material 415 are deposited in space 410 additive particles 420 may be in an unaligned or randomly aligned configuration. FIG. 4 shows an example of such an unaligned configuration of additive particles 420. Electrodes 425 and 430 may be used to apply an electric field to the additive particles 420, which field may be used to align additive particles 420 while matrix material 415 is still in its flowable state. FIG. 5 shows a set of arrows 505 which represent schematically examples of the electric field lines that may be generated using electrodes 425 and 430.

Figure 6:
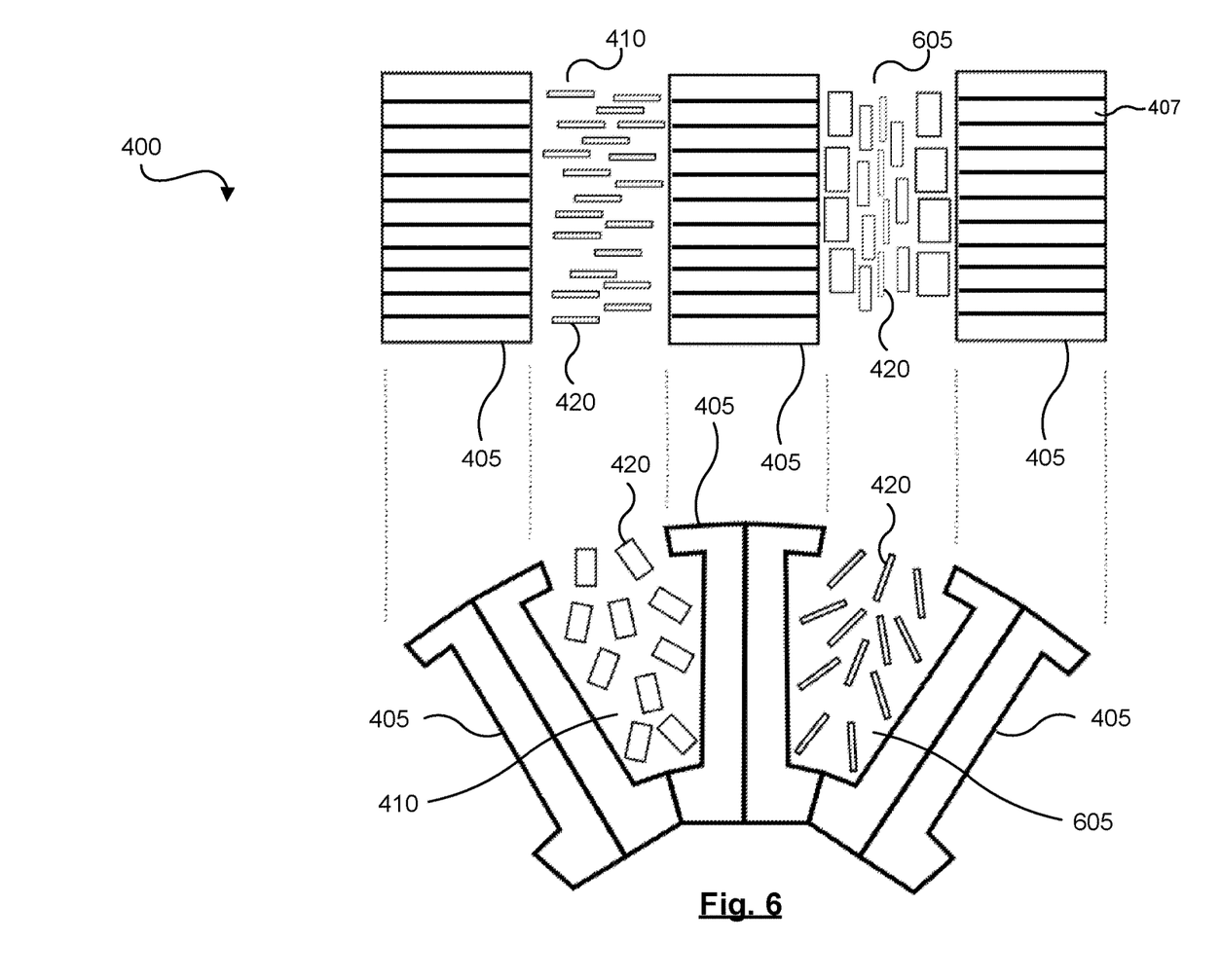
FIG. 6 shows yet another partial side elevation view and a top plan schematic view of the stator of FIG. 4, in accordance with a non-limiting implementation of the present specification.

FIG. 6, in turn, shows partial side elevation and top plan schematic views of stator 400 with additive particles 420 in two different aligned configurations. The side elevation view is shown in the bottom portion of FIG. 6, while the top plan view is shown in the top portion of FIG. 6. As described in relation to FIGS. 4 and 5, such an aligned configuration may be obtained by electrifying electrodes 425 and 430 (shown in FIGS. 4 and 5) to generate an electric field that aligns additive particles 420. As shown in FIG. 6, additive particles 420 in space 410 are aligned using the electric field shown in FIG. 5. Additive particles 420 in space 410 are aligned with the electric field such that the plane of additive particles 420 is in the plane of the side elevation view shown in FIG. 6.

Additive particles 420 in space 605 (also referred to as a stator slot), in turn, are aligned using the electric field shown in FIG. 5 such that the edges of additive particles 420 are in the plane of the side elevation view shown in FIG. 6. It is contemplated that in some examples, the electric field used to align the additive particles in the aligned configuration shown in space 410 may be different than the electric field used to align the additive particles in the corresponding aligned configuration shown in space 605.

Moreover, it is contemplated that in some examples, the same electric field may be used to align the additive particles in the different aligned configurations shown in spaces 410 and 605. In examples where the same electric field is applied to both spaces 410 and 605 and yields different aligned configurations of additive particles 420, the differences in the aligned configurations may be due to small differences in the initial or subsequent conditions at the start or during the alignment process respectively. In some examples, such conditions may include the unaligned configuration of additive particles 420 at the start or during the alignment process, and the like.

Figure 7:
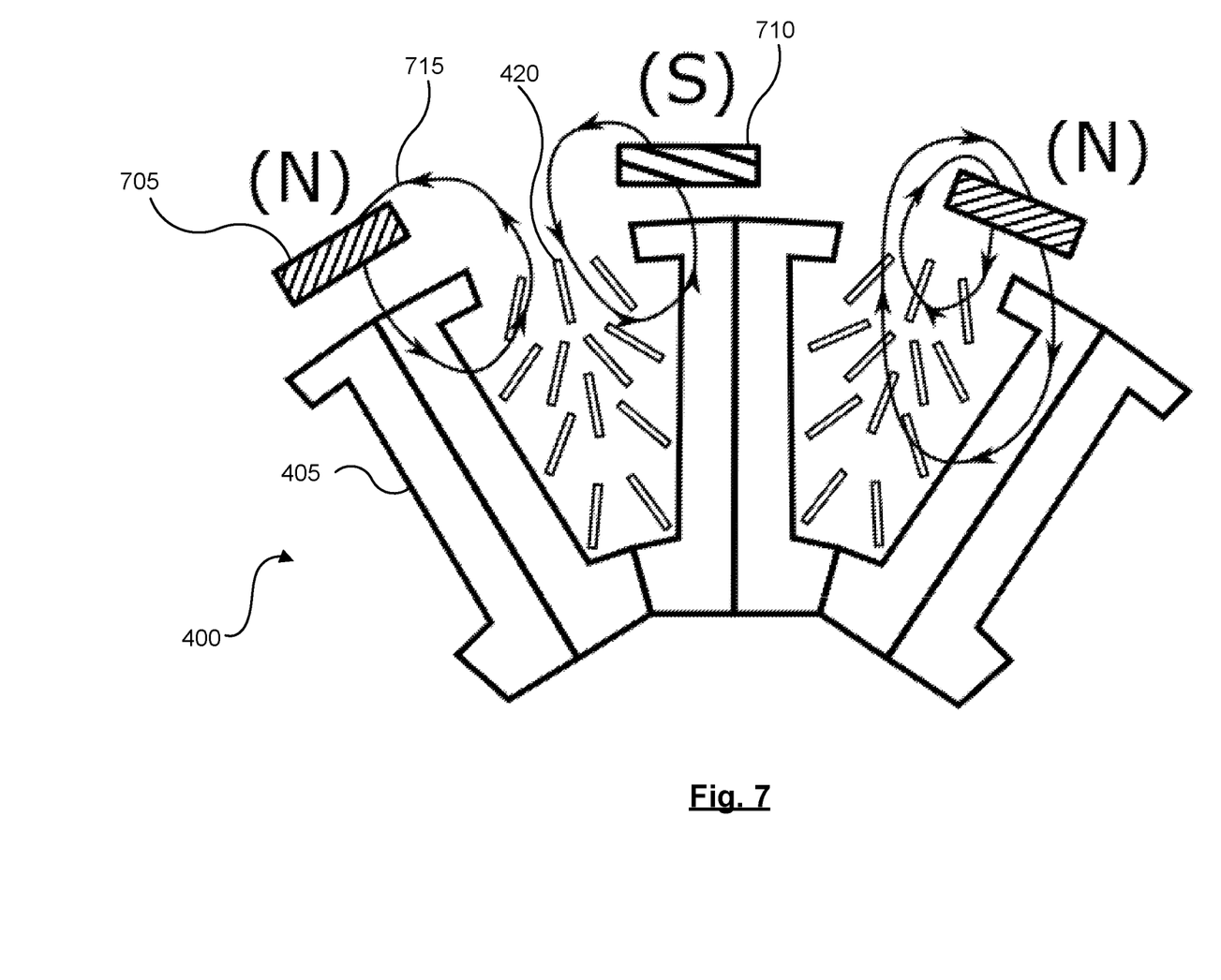
FIG. 7 shows yet another partial side elevation schematic view of the stator of FIG. 4 along with example permanent magnets which magnets may be components of an example rotor of an example electric motor, in accordance with a non-limiting implementation of the present specification.

The two different aligned configurations of additive particles 420 may interact differently with the electric or magnetic fields present during the operation of a motor that includes stator 400. FIG. 7 shows a partial, side elevation schematic view of stator 400 along with permanent magnets 705 and 710, which magnets may be components of a rotor of an electric motor that incorporates stator 400. Other components of the rotor and of the electric motor are omitted from FIG. 7 for ease of illustration. A selection of magnetic field lines between stator 400 and the permanent magnets of the rotor are depicted in FIG. 7. Magnetic field line 715 is an example of such magnetic fields. It is contemplated that other magnetic fields lines and surfaces may also exist between the stator teeth and the magnets of the rotor.

The aligned configuration of additive particles 420 shown in FIG. 7 is similar to or the same as the alignment of additive particles 420 in space 605 shown in FIG. 6. In this aligned configuration, the planes of the additive particles may lie along or be tangential to the operating electromagnetic field lines such as field line 715. In other words, the planes of the additive particles 420 extend longitudinally along the operating electromagnetic field lines 715. In examples where the additive particles comprise flakes or sheet-like particles that are electrically conductive in their in-plane directions, this orientation of the flakes may represent a relatively low level of interaction between the additive particles and the magnetic field lines of the magnetic fields used to operate the electric motor. This low level of interaction between the additive particles and the magnetic fields may allow parasitic interactions between the additive particles and the operating magnetic fields to be kept correspondingly low. This may reduce eddy current losses when the electric motor is in operation.

For comparison, additive particles that are in an unaligned (e.g. as shown in FIG. 4) or differently aligned configuration where magnetic field lines may more frequently pass through or intersect the planes of the additive particles may result in relatively higher parasitics. Such parasitics, in turn, may degrade the operating magnetic fields of the motor, may cause parasitic heating of the motor components, or may otherwise degrade the electromagnetic performance of the electric motor.

The oriented configuration of additive particles 420 shown in space 410 of FIG. 6 may allow for lower additive particle-magnetic field interactions than the aligned configuration shown in space 605 of FIG. 6 and in FIG. 7. In the aligned configuration shown in space 410, additive particles 420 are oriented about edge-on relative to the lines and planes of the operating electromagnetic field such as those shown in FIG. 7. This edge-on alignment presents a relatively smaller area of interaction with the lines and fields of the magnetic field when compared to the alignment of the additive particles shown in space 605 where the planes of the additive particles may potentially interact with the lines or surfaces of the magnetic field. As such, among the aligned configurations of the additive particles shown in FIG. 6, the aligned configuration shown in space 410 may allow for relatively reduced interactions, and correspondingly less parasitic effects, between the additive particles and the operating magnetic fields of the electric motor. This may reduce eddy current losses when the electric motor is in operation.

In the examples above, the additive particles 410 and 605 are planar flakes that extend longitudinally along the operating electromagnetic field lines 715 in the aligned configuration. In some examples, the planar flakes may be substantially parallel with the operating electromagnetic field lines. For example, the average parallelism of the planar flakes and the operating electromagnetic field lines 715 may be within an acceptable deviation. The acceptable deviation may be less than 10-degrees, or more preferably, less than 5-degrees. This longitudinal alignment may help reduce eddy current losses with both additive particles 410 and 605.

The edge-on aligned configuration of the particles 410 may further reduce eddy current losses compared to the aligned configuration of the particles 605 by reducing the perpendicular cross-sectional area relative to the operating electromagnetic field lines. For example, with reference to the top plan view of FIG. 6, the edge-on aligned configuration of the additive particles 410 may be oriented in planes aligned with the laminated plate stack 407 of the stator 400. In some examples, the additive particles 410 may be oriented in planes that are substantially parallel with the laminated plate stack 407. For example, the average parallelism of the additive particles 410 and the laminated plate stack 407 may be within an acceptable deviation. The acceptable deviation may be less than 10-degrees, or more preferably, less than 5-degrees.

Moreover, as shown in FIG. 6, in the aligned configurations shown in spaces 410 and 605 the additive particles are dispersed or aligned such that the additive particles do not touch each other. This, in turn, may reduce the likelihood of formation of electrically conductive pathways through the volume of the composite material formed in spaces 410 and 605 once the additive particles are oriented and the matrix material sets. The absence or reduction of electrically conductive pathways may reduce the likelihood of the composite material being electrically conductive and causing electrical shorts between the different electrical components of stator 400 or its corresponding electric motor.

In other words, the additive particles may enhance the thermal conductivity of the composite material thereby enhancing the ability of the composite material to act as a thermal conductor or as a thermal management material. Moreover, by tailoring the shape of the external force field used to align the additive particles, the additive particles may be aligned in direction(s) in which the heat is to be conducted from the components where it is generated to locations where the heat can be safely dissipated.

This enhanced or tailored thermal conductivity of the composite material may be augmented by relatively low or no electrical conductivity (to avoid causing electrical shorts or other electromagnetic parasitics) achieved by tailoring the concentration, alignment, or other properties of the additive particles to avoid conductive pathways formed through the composite material by the aligned additive particles. In this manner, the composite material may be tailored to have enhanced thermal conductivity along selected directions, while having reduced electrical conductivity (such as low or no electrical conductivity) along some directions or along all directions.

While in the example shown in FIG. 6 the additive particles are shown as being spaced from one another to avoid the formation of electrically conductive pathways in the composite material, it is contemplated that in some examples some of the additive particles may contact one another in their aligned configuration. Moreover, in some examples, such contacts may form conductive pathways that extend through the volume of the composite material. Such examples of the composite material with these conductive pathways may be used in applications where other electrical insulation is in place and some electrical conductivity in the composite material is less likely to cause electrical shorts.

Furthermore, in some examples, controlling the concentration of the additive particles in the matrix material may be used to tailor the spacing or separation between the additive particles in their aligned configuration. Moreover, in some examples, other parameters may also be used to control the aligned configuration of the additive particles in the matrix material. Examples of such parameters may include the strength or shape of the electric field used to align the particles, the variation of this electric field over time, the duration of the application of the electric field to the additive particles, the viscosity or other measures of the resistance to additive particle alignment posed by the matrix material, the gel time of the matrix material, and the like.

Figure 8:
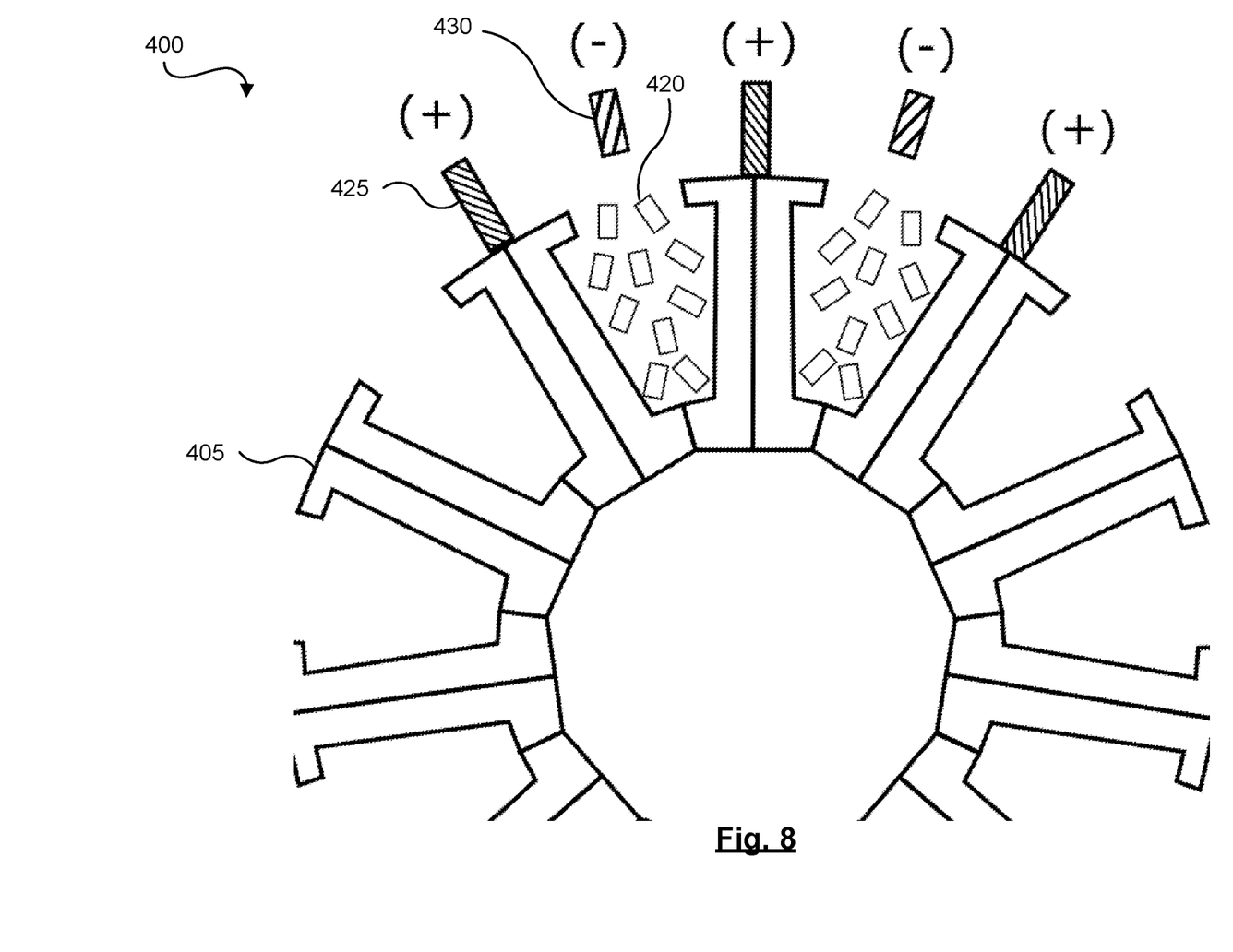
FIG. 8 shows yet another partial side elevation schematic view of the stator of FIG. 4, in accordance with a non-limiting implementation of the present specification.
Figure 9:
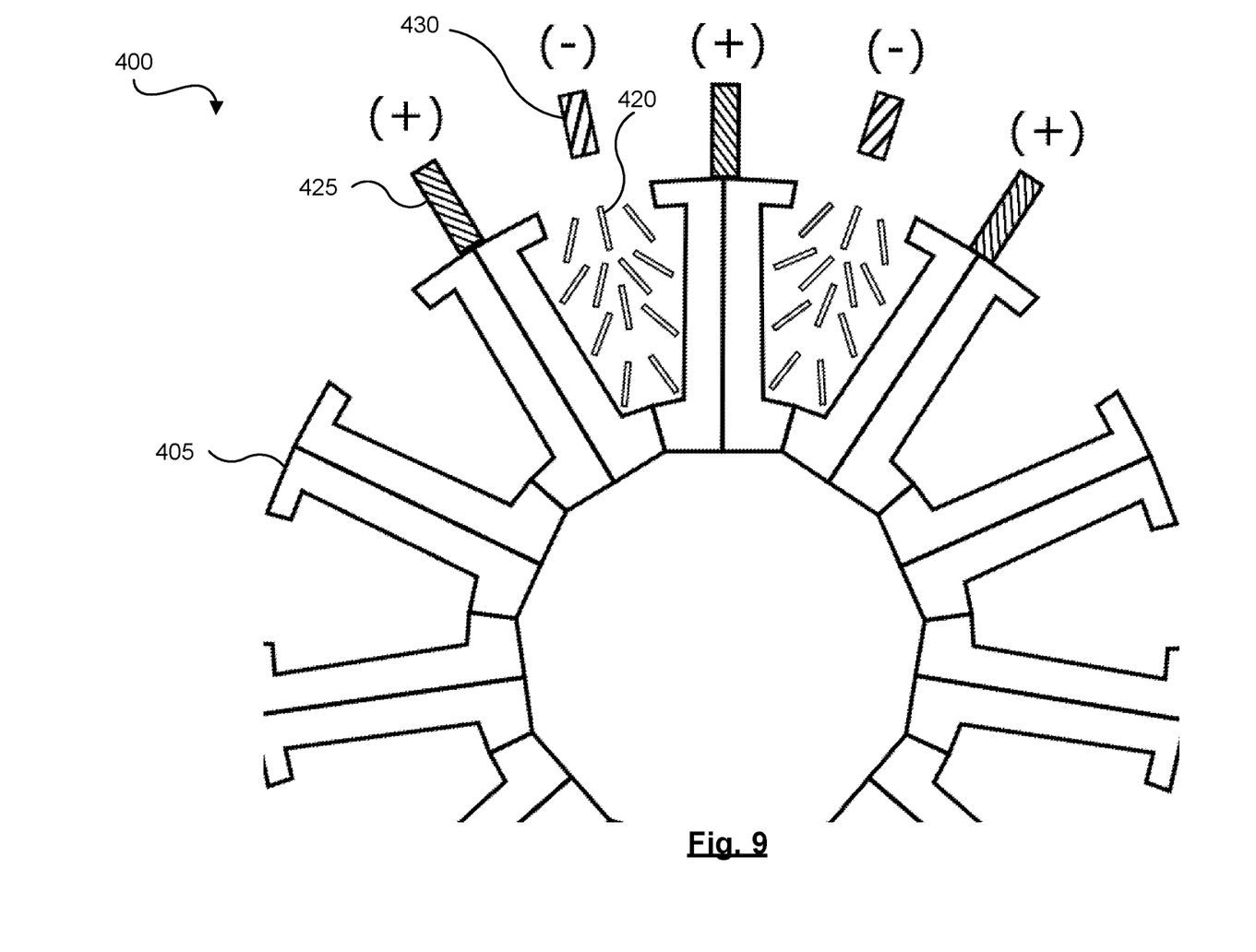
FIG. 9 shows yet another partial side elevation schematic view of the stator of FIG. 4, in accordance with a non-limiting implementation of the present specification.

Turning now to FIG. 8, a partial, side elevation schematic view is shown of stator 400. In FIG. 8, electrodes 425 and 430 are used to apply an electric field to additive particles 420 to align the additive particles in an orientation similar to, or the same as, the aligned configuration shown in space 410 of FIG. 6. FIG. 9, in turn, shows a partial side elevation schematic view of stator 400. In FIG. 9, electrodes 425 and 430 are used to apply an electric field to additive particles 420 to align the additive particles in an orientation similar to, or the same as, the aligned configuration shown in space 605 of FIG. 6.

In some examples, the matrix material used to form the composite material in stator 400 may comprise unsaturated polyester. Moreover, in some examples, the additive particles may comprise graphene flakes or sheet-shaped particles. Furthermore, in some examples, during the setting process double bonds or other available bonding sites in the polyester may form chemical bonds with graphene. These bonds, in turn, may enhance the thermal conduction between the polyester (i.e. the matrix material) and the graphene particles (i.e. the additive particles), thereby enhancing the thermal conductivity of the composite material. In addition, it is contemplated that in some examples matrix materials other than polyester and additive particles other than graphene may also be used.

In addition, while the examples shown in FIGS. 4-9 show the composite material as being deposited or formed in the space(s) between the stator teeth, it is contemplated that in some examples a composite material may be deposited or formed in different parts or spaces of an electric motor. Moreover, it is contemplated that in some examples the composite material may be formed on or in an electrical device other than an electric motor. Examples of such electrical devices may include transformers, printed circuit boards, and the like. Furthermore, it is contemplated that in some examples the composite material may be formed in a mold, and once the mixture of the matrix material and the additive particles is set, be liberated as a freestanding composite material component upon removal of the mold.

Furthermore, the additive particle alignment considerations discussed in relation to stator 400 may also be applied to aligning the additive particles to form a composite material that is to be used in relation to a different electrical device. Such considerations may include aligning the additive particles to provide enhanced thermal conductivity paths through the composite material along directions that extend from the thermal source(s) to the thermal sink(s) in the environment or device in which the composite material is to be deployed.

Moreover, such considerations may also include aligning the additive particles to have reduced interaction with the operating magnetic or electric fields in the device or application in which the composite material is to be deployed. Reducing such interactions may reduce corresponding eddy current losses or parasitic effects that could be caused by the additive particles of the composite material interacting with the operating magnetic or electric fields in the device or application in which the composite material is to be deployed.

In addition, such considerations may include reducing or avoiding the formation of electrically conductive pathways through the composite material to reduce the risk of the composite material causing electrical shorts in the devices or applications in which the composite material is to be deployed.

It is contemplated that method 100 and the other methods described herein may be used to form the composite materials described in relation to stator 400 and the other composite materials described herein. It is also contemplated that method 100 and the other methods described herein may be used to form composite materials other than those described herein in relation to stator 400. Moreover, it is contemplated that the composite materials described in relation to stator 400 and the other composite materials described herein may be formed using method 100 or the other methods described herein. It is also contemplated that the composite materials described in relation to stator 400 and the other composite materials described herein may be formed using methods other than method 100 and the other methods described herein.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether some of the embodiments described herein are implemented as a software routine running on a processor via a memory, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto. It should be recognized that features and aspects of the various examples provided herein may be combined into further examples that also fall within the scope of the present disclosure.

The invention claimed is:

1. An electric motor comprising:
   a) a stator having a stator slot; and
   b) a composite material within the stator slot, the composite material including:
      i) a matrix material; and
      ii) additive particles having thermal conductivity, and anisotropic electric properties;
   wherein the additive particles are oriented in an aligned configuration and set to provide the composite material with thermal conductivity and reduced electrical conductivity in at least one direction based on the aligned configuration.

2. The electric motor claim 1, wherein the additive particles were oriented into the aligned configuration using an electromagnetic field.

3. The electric motor of claim 1, wherein the matrix material includes a thermoset material selected to cooperate with the additive particles to enhance thermal conductivity of the composite material within the stator slot after setting of the matrix material.

4. The electric motor of claim 3, wherein the thermoset material is unsaturated polyester, and the additive particles are graphene flakes.

5. The electric motor of claim 1, wherein the additive particles are planar flakes that extend longitudinally along operating electromagnetic field lines of the electric motor in the aligned configuration.

6. The electric motor of claim 5, wherein the planar flakes are substantially parallel with the operating electromagnetic field lines of the electric motor in the aligned configuration.

7. The electric motor of claim 6, wherein the additive particles in the aligned configuration are edge-on relative to the operating electromagnetic field lines of the electric motor.

8. The electric motor of claim 1, wherein the stator includes a laminated plate stack, and the additive particles are oriented in planes aligned with the laminated plate stack.

9. The electric motor of claim 8, wherein the additive particles are substantially parallel with the laminated plate stack.

10. A method comprising:
    a) depositing a matrix material into a stator slot of an electric motor, the matrix material being settable, and including additive particles having:
       i) thermal conductivity; and
       ii) anisotropic electric properties;
    b) applying an electromagnetic field to the matrix material to orient the additive particles in an aligned configuration; and
    c) setting the matrix material while the additive particles are in the aligned configuration to form a composite material having thermal conductivity and reduced electrical conductivity in at least one direction based on the aligned configuration.

11. The method of claim 10, wherein the matrix material includes a thermoset material selected to cooperate with the additive particles to enhance thermal conductivity of the composite material within the stator slot after setting of the matrix material.

12. The method of claim 11, wherein the thermoset material is unsaturated polyester, and the additive particles are graphene flakes.

13. The method of claim 10, wherein the additive particles are planar flakes that extend longitudinally along operating electromagnetic field lines of the electric motor in the aligned configuration.

14. The method of claim 13, wherein the planar flakes are substantially parallel with the operating electromagnetic field lines of the electric motor in the aligned configuration.

15. The method of claim 14, wherein the additive particles in the aligned configuration are edge-on relative to the operating electromagnetic field lines of the electric motor.

16. The method of claim 10, wherein the electric motor includes a stator having a laminated plate stack, and the additive particles are oriented in planes aligned with the laminated plate stack.

17. The method of claim 16, wherein the additive particles are substantially parallel with the laminated plate stack.

18. The method of claim 10, wherein the electromagnetic field is applied using DC current.

19. The method of claim 10, wherein the electromagnetic field is applied using AC current.

20. The method of claim 10, wherein the electromagnetic field includes:
    a) a first electromagnetic field for aligning some of the additive particles in a first aligned configuration; and
    b) a second electromagnetic field for aligning some of the additive particles in a second aligned configuration.

* * * * *